(12) United States Patent
Ayoub

(10) Patent No.: US 7,307,950 B2
(45) Date of Patent: Dec. 11, 2007

(54) METHOD IN A COMMUNICATION SYSTEM

(75) Inventor: Souhad Ayoub, Kista (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 859 days.

(21) Appl. No.: 10/416,450

(22) PCT Filed: Nov. 2, 2001

(86) PCT No.: PCT/SE01/02424

§ 371 (c)(1),
(2), (4) Date: Jun. 13, 2003

(87) PCT Pub. No.: WO02/39767

PCT Pub. Date: May 16, 2002

(65) Prior Publication Data

US 2004/0082324 A1    Apr. 29, 2004

(30) Foreign Application Priority Data

Nov. 10, 2000    (SE)    .................................... 0004129

(51) Int. Cl.
*H04L 1/00*    (2006.01)

(52) U.S. Cl. ....................... 370/230; 370/253; 370/338
(58) Field of Classification Search ................ 370/231, 370/230.1, 232, 233, 469, 450, 378, 329, 370/230, 252, 338, 341, 352, 395.4, 253; 455/452.2, 422.1; 709/205, 225, 233
See application file for complete search history.

(56) References Cited

U.S. PATENT DOCUMENTS

| | | | | |
|---|---|---|---|---|
| 5,282,195 A | * | 1/1994 | Hood et al. | .................. 370/378 |
| 5,835,484 A | * | 11/1998 | Yamato et al. | ............... 370/230 |
| 5,940,370 A | * | 8/1999 | Curtis et al. | ................. 370/231 |
| 6,094,418 A | * | 7/2000 | Soumiya et al. | ............ 370/231 |
| 6,115,393 A | * | 9/2000 | Engel et al. | ................. 370/469 |
| 6,163,808 A | * | 12/2000 | Kilkki | ......................... 709/233 |
| 6,338,046 B1 | * | 1/2002 | Saari et al. | .................... 705/34 |
| 6,374,112 B1 | * | 4/2002 | Widegren et al. | ......... 455/452.2 |
| 6,469,992 B1 | * | 10/2002 | Schieder | ...................... 370/329 |
| 6,493,331 B1 | * | 12/2002 | Walton et al. | ............... 370/341 |
| 6,512,743 B1 | * | 1/2003 | Fang | .......................... 370/232 |

(Continued)

FOREIGN PATENT DOCUMENTS

EP    0848560 A2    6/1998

(Continued)

*Primary Examiner*—Ricky Q. Ngo
*Assistant Examiner*—Kan Yuen
(74) *Attorney, Agent, or Firm*—Nixon & Vanderhye P.C.

(57) ABSTRACT

The invention relates to a method for improving the quality of service for data traffic in a mobile communication system, which uses GPRS (General Packet Radio System). The invention may also be used in other types of data networks, using packet switched traffic, e.g. the next generation mobile telecommunication system UMTS. The improvement of the quality of service is attained by defining a number of operator specific parameters, which give better possibility to monitor and control of the quality of service within an area or for a given user. These parameters are then used by the operator in order to give the user better service. Using this invention the operator may in a better way attain the promised quality of service, both on user and area basis.

19 Claims, 2 Drawing Sheets

U.S. PATENT DOCUMENTS

| | | | |
|---|---|---|---|
| 6,542,736 B1 * | 4/2003 | Parkvall et al. | 455/452.2 |
| 6,574,211 B2 * | 6/2003 | Padovani et al. | 370/347 |
| 6,603,753 B1 * | 8/2003 | Bedekar et al. | 370/335 |
| 6,671,257 B1 * | 12/2003 | Soumiya et al. | 370/230.1 |
| 6,728,270 B1 * | 4/2004 | Meggers et al. | 370/514 |
| 6,744,780 B1 * | 6/2004 | Gu et al. | 370/450 |
| 2002/0059378 A1 * | 5/2002 | Mustafa | 709/205 |
| 2002/0095498 A1 * | 7/2002 | Chanda et al. | 709/225 |

FOREIGN PATENT DOCUMENTS

| | | |
|---|---|---|
| WO | 99/05828 A1 | 2/1999 |
| WO | 9948310 A1 | 9/1999 |
| WO | 01/15355 A1 | 3/2001 |

* cited by examiner

METHOD IN A COMMUNICATION SYSTEM

This application is the U.S. national phase of international application PCT/SE01/02424, filed 2 Nov. 2001, which designated the U.S.

FIELD OF THE INVENTION

The present invention relates to the area of mobile telecommunication systems. More closely, the invention relates to a method concerning operator specific optional services in a cellular mobile telecommunication system having option for packet-switched data.

The invention relates specifically, but not only, to a method for improvement of the quality of service in a mobile telecommunication system of the type GSM (Global System for Mobile telephony) with the packet data option GPRS (General Packet Radio System).

BACKGROUND

In a digital mobile telecommunication system using TDMA, the information is transferred between radio nodes and one or more mobiles, where the payload information may comprise speech information in a speech connection or data information in a data connection. In FIG. 1, an example is shown of such a system having a radio node BTS1, which communicates with two mobiles MS1 and MS2 which are located within a certain area C1 which is controlled by the node BTS1.

Transmission is performed via allocated radio channels within certain frequency bands, which are divided into two parts; uplink when the mobile sends to the radio node, and downlink when the radio node sends to a mobile.

One example of a digital TDMA-system is GSM, in the standard of which a packet data option is described which introduces packet data in a GSM-network. This technique is called GPRS and involves that data traffic is sent using a packet-switched technique instead of a circuit-switched technique, which is the case for GSM without packet data option. With GPRS present in a GSM-network possible and also the possibility for a user to be connected to the data network all the time.

In a GSM-network having GPRS, the radio channels are used efficiently by that a GPRS-terminal only uses a radio channel when it is sending or receiving data, the rest of the time it is silent and allows other terminals to use the channel. The radio channel PDCH (Packet Data Channel), which is allocated for GPRS, may be of two different types:

Dedicated PDCH, which only can be used for GPRS. The number of dedicated PDCH in each cell is decided by the operator, depending on the load or wish for capacity. This type of channel guarantees that there will always be capacity for GPRS in a cell;

On-demand PDCH, which can be cleared for incoming circuit-switched calls in a loaded cell. In such a channel, circuit-switched traffic always has priority and the GPRS-traffic cannot always be guaranteed.

In FIG. 2, an example is shown of how a set of two radio channels RF1, RF2 can have time slots allocated for both circuit-switched and packet-switched traffic. In RF1, the time slots 2, 3, 4 are allocated for circuit-switched traffic, i.e. speech traffic. In RF2, the time slots 5, 6 are allocated for circuit-switched traffic, while the time slots 1, 2, 3, 4 in RF2 are allocated for packet-switched traffic. In RF1, moreover, two time slots 6, 7 are allocated for On-demand PDCH, i.e. they are used, when needed, for circuit-switched traffic which has executive override, but can also be used for packet-switched traffic if they are free. Finally, the time slots 0, 1 in RF1 are allocated for signalling.

For a terminal to be able to use GPRS, it needs primarily to cedure. Firstly, in order to tell the operator that use will be made of GPRS and, secondly, in order to receive an IP-address to be able to send and receive data. The first step is GPRS-attach, which means that a logical link is formed between the terminal and the SGSN (Serving GPRS Support Node) in question. SGSN is the node which, among other things, performs the transport of incoming and outgoing IP-packets to and from terminals within its so-called SGSN service area, i.e. the area which is taken care of by a SGSN.

The second step is a PDP-Context activation, which means that the specific GGSN (Gateway GPRS Support Node) is informed of that the terminal being there and where it is. GGSN is the node which i.a. takes care of the interface between a GPRS-network and external IP-networks. A PDP-Context activation can be done at any time, e.g. long before data in reality is to be sent, since a user does not use any radio resources as long as he is not sending or receiving data. A PDP-Context activation can remain for any length of time, e.g. several days, all depending on the user's wishes, the limitation of the terminal or any other factor which limits the time.

This activation can be compared to a login on a network, the terminal thereby receiving an IP-address, static or dynamic, which then allows it to start sending and receiving data via IP-packets.

In order then to enable the user to use the data services, having different claims on data rate and delay of data packets offered by the operators, a number of attributes for quality of service have been standardized, as described in the Standard GSM (GSM 02.60, GSM 03.60):

Priority, Service Precedence, is divided into three different classes, indicating the priority of a certain service, and the packets belonging to this service. A service of a lower priority runs the risk of losing data packets when the I which means that a data packet of higher priority has precedence in the network;

Delay is divided into four classes defining which delay that is acceptable in the network;

Reliability is divided into three classes defining the probability for lost data packets, faulty data packets, doublets of data packets and data packets in the wrong order;

Peak Data Rate specifies the highest data rate in the network expected during a whole PDP-Context;

Mean Data Rate specifies the mean data rate expected in the network during a whole PDP-Context.

SUMMARY

One problem in mobile telecommunication systems of the type GPRS is that the attributes defined in the GSM-standard for quality of service in GPRS are not quite sufficient to keep the promised quality of service.

Another problem is that the attribute defined for GPRS for mean data rate is calculated for a whole PDP-Context, which is the whole time a user has an assigned IP-address. The problem is that a PDP-Context may be several days long, which does not give any dependable indication of the real mean data rate during the active time.

Thus, one object of the present invention is to solve the problems of missing means for maintaining and controlling the promised quality of service, by introducing new operator-specific parameters giving a better control of the quality of service.

Another object is to procure a more dependable indication o: within an area for a certain user.

New operator-specific parameters are defined which facilitate maintenance and control of the promised quality of service. These parameters comprise e.g. a user's minimum values of acceptable data rate, and measured values for comparison with said minimum value. Further, there are parameters for how and when measurement values should be calculated.

Advantages are that it will be easier to maintain promised quality of service using the new parameters.

Another advantage is that it will also be easier to control the quality of service both on the area and user level.

Further advantages are that an operator will have a better possibility to dimension a GPRS-network and to better control a channel-allocating algorithm to be able to fulfil promises to guarantee a certain level of quality of service.

DETAILED DESCRIPTION

The technology described is intended for a communication system which handles packet-switched data transport. One example of such a system is the mobile telecommunication system GSM with the packet data addition GPRS. Such a system comprises one or more radio nodes and one or more mobiles, which communicate with each other via a given radio channel.

The new parameters introduced in a communication system, e.g. GPRS, are described as follows:

MAMAT (Minimum Acceptable Mean throughput during Active Time) defines the smallest acceptable data rate during the time when a user is active. This parameter is determined by the operator and may be set either at user level or area level, where the area may comprise, for example, a mobile cell or a LAN;

MAT (Mean throughput during Active time) defines the data rate mean value during the time when a user is active. It can be calculated as a mean value of a number of measured values during a certain time, here called the active time;

and T-window, which is the number of active times during which MAT is calculated. This means that T-window is the number of values for data rate used for mean value calculation of MAT.

This gives two parameters (MAMAT, T-window) determined by the operator, and a third (MAT) which is calculated. Further, different users may have different MAMAT- and T-window values. Different areas, e.g. mobile cells, may have different MAMAT for one and the same user, and MAMAT may also be different for uplink and downlink, respectively, for the same user. These choices are used by the operator to attain desired quality of service.

The active time T is the time during which a MAT-value for measured. Preferably, the active time T corresponds to the time during which a user is active, i.e. during the time he is sending or receiving data. However, it may also be defined in other ways, e.g. as a factor of the user's earlier use, or just a certain time determined by the operator.

The data rate included in the new parameters may be either effective or raw data rate. Raw data rate is the actual data rate without any consideration taken to bit error ratio. The effective data rate may, on the other hand, be defined as the raw data rate multiplied by the bit error ratio, i.e. the final payload data which the user really receives.

When the new parameters MAT, MAMAT and T-window have been defined, one will in a better way be able to control and maintain promised quality of service. This is done through calculating a user's MAT-value and then comparing it to a defined MAMAT-value. In this way, one may obtain a measure as to whether promised quality of service is fulfilled.

Figure 1:
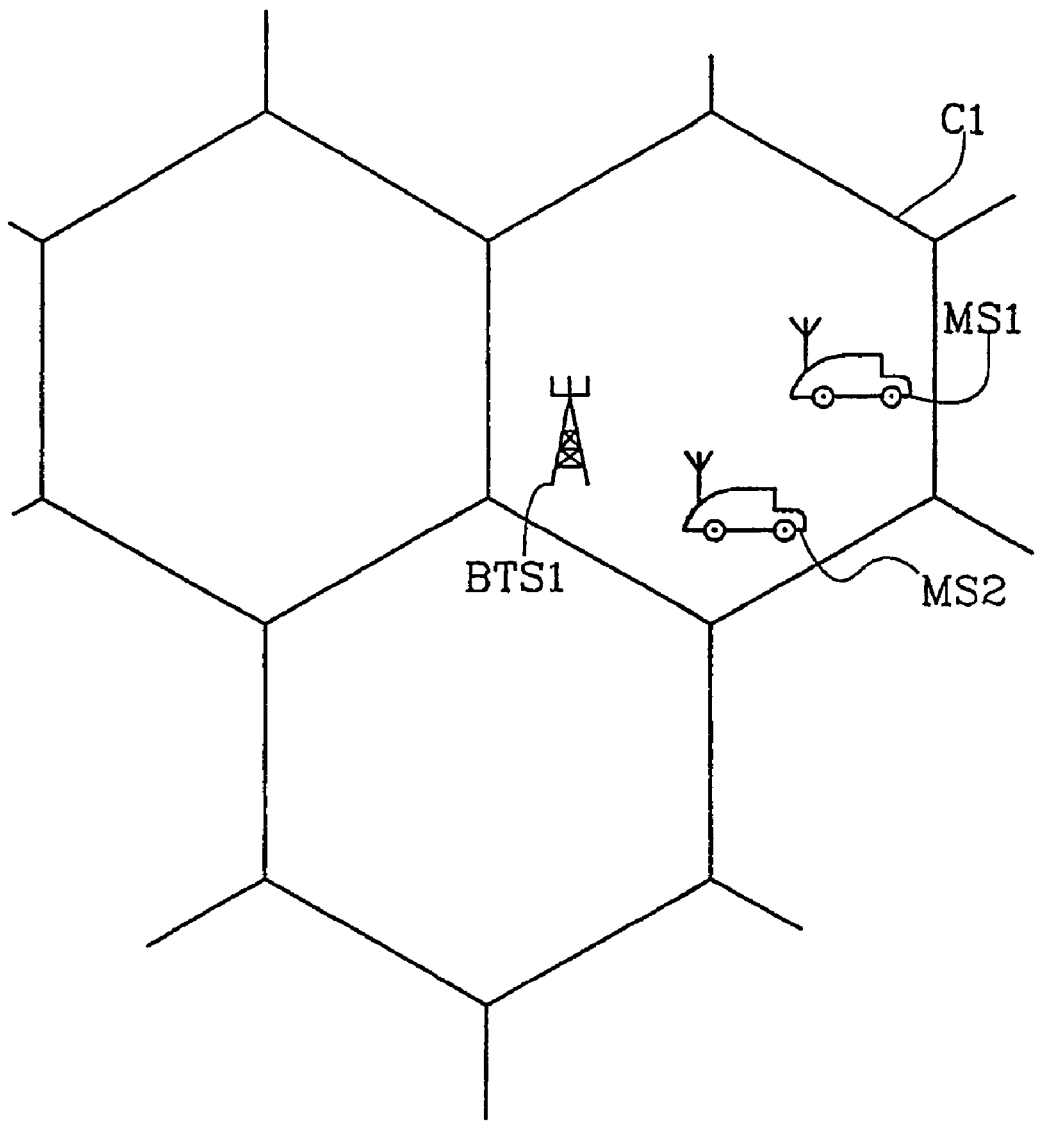
FIG. 1 shows a communication system of a known type having nodes and terminals.
Figure 2:
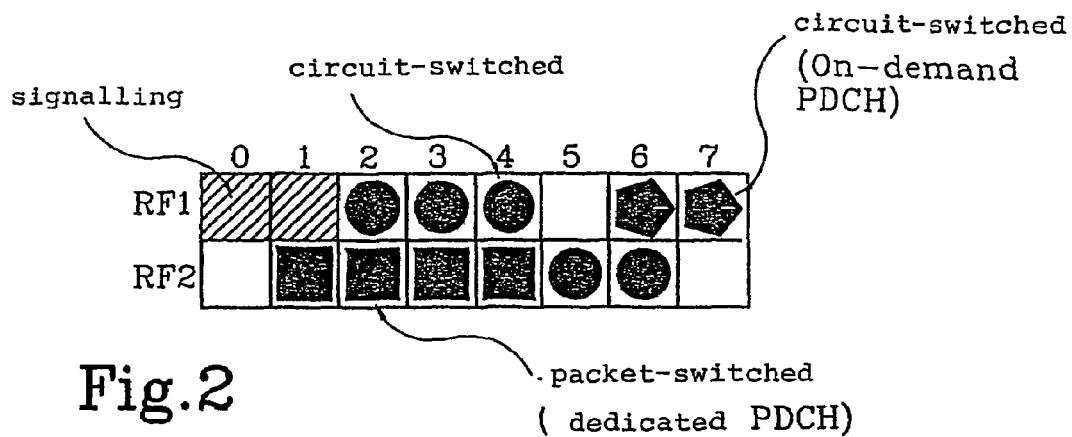
FIG. 2 shows an example of how a set of radio channels may be allocated.
Figure 3:
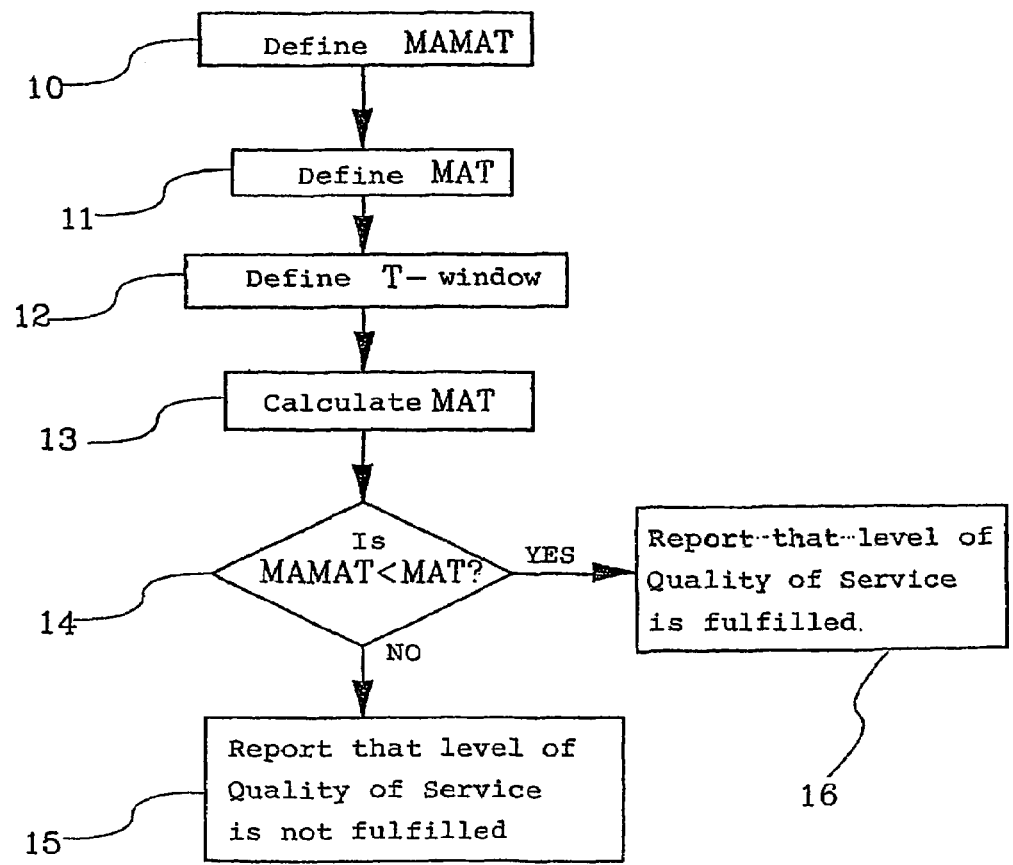
FIG. 3 shows an example of a flowchart.

FIG. 3 shows a flowchart of an example embodiment. The first step 10 defines MAMAT, the second step 11 defines MAT and the third step 12 defines T-window. In the fourth step 13, a value of MAT is calculated, which may be for a user or a whole area. In step 14, MAMAT is compared to MAT to see if the promised level of quality of service is fulfilled. If MAMAT is less than MAT (YES), the system fulfils the promised level of quality of service and will perform step 16, where it can be reported back that this is the case. If this is not the case (NO), i.e. that MAMAT is greater than MAT, the promised level of quality of service is not fulfilled, and step 15 will be performed and report that this is not the case. In step 15 may also be included a static counter which is increased for each case where the level of quality of service is not fulfilled, in order to prove how many or how great ratio does not receive promised capacity.

One example of use of the technology is when an operator determines a MAMAT-value of 20 kbits/s for user A and 50 kbits/s for user B. User A then receives 45 kbytes which takes 15 seconds. User B receives on three different occasions 10 kbytes during 4 seconds, 100 kbytes during 30 seconds and 30 kbytes during 10 seconds. These transmissions may to the user seem to work well, but when calculating MAT, user A receives a MAT-value of 24 kbits/s (45/15)·8) and user B receives a MAT-value of 23.5 kbits/s (((10/4)+(100/30)+(30/10)·8)/ 3). A comparison of MAT to MAMAT, however, shows that the operator is not fulfilling the promised quality of service for user B, and therefore more capacity must be allocated to him.

In the above example, the parameter T-window is 1 for user A, i.e. an active time of 15 seconds, forming the mean value. For user B, the T-window is 3, i.e. three active times of 4, 30 and 10 seconds, respectively, forming the mean value.

Further, the level of quality of service can be described as a measure of the level of guaranteed data rate or another measure. This means that if an operator offers 100% level of quality of service, it will indicate the guaranteed level of quality of service to all GPRS-users anywhere, anytime. However, if the level of quality of service is 0%, this indicates that all GPRS-traffic is of the type best-effort. Another example is when the operator offers 90% level of quality of service, which means that during 90% of the time, quality of service is guaranteed, while during the rest of the time the best-effort is offered.

The level of quality of service together with the new parameters may then be used by operators when dimensioning networks. The operator then sets MAMAT and T-window on area or user level. To be able to set the parameters on area level, makes it possible for the operator to set a lower tolerance within areas which are often overloaded. Further, a static counter is included, which indicates the portion or the number of users who have their MAT less than MAMAT, or the portion of the active time when a user has his MAT less than MAMAT. This better support in exploring if set goals for level of quality of service are fulfilled, or if the network needs to be redimensioned.

The new parameters also offer the possibility to introduce a channel-allocating algorithm, which will help in allocating or de-allocating GPRS-specific time slots. The purpose of the algorithm is, when a need arises, to increase or decrease the number of time slots used for GPRS. The need may, for example, be an increased demand for data rate or a user who is going to connect a speech call, which has a higher priority on account of being circuit-switched and has priority in radio channels of the type On-demand PDCH.

An algorithm for channel allocation may be divided into several different portions, e.g. one part which handles new incoming terminals in the area, e.g. a new mobile which enters a new cell, or a new user who logs in on a network, and a part which handles already existing terminals in the area.

The invention is, of course, not limited to the above described and on the drawings shown embodiments, but can be modified within the scope of the appended claims. The invention may, for example, also be applied to local data networks (LAN), Ethernet-based networks, a big TCP/IP-based network, or a mobile UMTS network of e.g. the type WCDMA, where mobile users can use high data rates and associated applications. The invention can also be used in other mobile systems, e.g. PDC (Personal Digital Cellular) and D-AMPS (Digital-Advanced Mobile Phone System), and all other communication systems which can carry data traffic.

The invention claimed is:

1. Method for generating and sustaining a predetermined quality of service for data traffic in a mobile radio communication system having a network including a number of nodes communicating with mobile radio terminals, where the communication is performed using packet switching, comprising the following steps performed within one or more nodes in the network:
    establishing for a mobile radio user terminal packet connection a first minimum acceptable mean throughput during active time parameter (MAMAT) representing a lowest acceptable data rate during a predetermined time period,
    determining a second mean throughput during active time parameter (MAT) for the mobile radio user terminal packet connection representing a measured data rate mean value during the time period, and
    comparing the first MAMAT parameter and the second MAT parameter, and
    performing control to provide a predetermined quality of service for the mobile radio user terminal packet connection based on the comparing,
    wherein the time period is determined for the mobile radio user terminal packet connection corresponds only to active time when the mobile radio user terminal packet connection is active.

2. Method according to claim 1, further comprising:
    measuring the actual data rate during a predetermined number of active time periods.

3. Method according to claim 2, wherein the measuring is performed during the predetermined number of active time periods corresponding to a third parameter.

4. Method according to claim 1, further comprising:
    providing a statistical counter to detect a number of times the first MAMAT parameter is greater than the second MAT parameter, which indicates a quality of service associated with the mobile radio user terminal packet connection has not been provided.

5. Method according to claim 1, wherein the first MAMAT parameter is set individually for each of multiple mobile radio user terminal packet connections.

6. Method according to claim 1, wherein the first MAMAT parameter and the predetermined time period are uniquely set for each section within the communication system.

7. Method according to claim 6, wherein the section is a cell in a mobile communication system.

8. Method according to claim 6, wherein the section is a wireless LAN.

9. Method according to claim 1, wherein a degree of quality of service corresponds to a proportion of time during which full quality of service is guaranteed.

10. Method according to claim 1, wherein the first and second parameters and the predetermined time period are used in dimensioning of a capacity in the network.

11. Method according to claim 1, wherein the mobile radio communication system is a GPRS system.

12. Method according to claim 1, wherein the mobile radio communication system is a UMTS-system.

13. A mobile radio communications network node for generating and sustaining a predetermined quality of service for data traffic in a mobile radio communication system having a network including a number of communications network nodes communicating with mobile radio user terminal connections, where the communication is performed using packet switching, the mobile radio communications network node, comprising:
    means for establishing for a mobile radio user terminal packet connection a first minimum acceptable mean throughput during active time parameter (MAMAT) representing a lowest acceptable data rate during a predetermined time period,
    means for determining a second mean throughput during active time parameter (MAT) for the mobile radio user terminal packet connection representing a measured data rate mean value during the time period, and
    means for comparing the first MAMAT parameter and the second MAT parameter, and
    means for performing control to provide a predetermined quality of service for the mobile radio user terminal packet connection based on the comparing,
    wherein the time period for the mobile radio user terminal packet connection corresponds only to active time when the user terminal is active.

14. The node according to claim 13, further comprising:
    means for measuring the actual data rate during a predetermined number of active time periods.

15. The node according to claim 14, wherein the measuring is performed during the predetermined number of active time periods.

16. The node according to claim 13, further comprising:
    a statistical counter for detecting a number of times the first MAMAT parameter is greater than the second MAT parameter, which indicates that the predetermined quality of service for the mobile radio user terminal packet connection has not been provided.

17. The node according to claim 13, wherein one or both of the first MAMAT parameter and the predetermined time period are set individually for each of multiple mobile radio user terminal packet connections.

18. The node according to claim 13, wherein the first MAMAT parameter and the predetermined time period are uniquely set for each section within the mobile radio communication system.

19. The node according to claim 13, further comprising:
    means for using the first and second parameters and the predetermined time period in dimensioning a capacity in the network.

* * * * *